July 2, 1963
L. LIEVRE
3,095,609
NOZZLE CLOSURE FOR INJECTION MOULDING PRESS
Filed Jan. 22, 1962
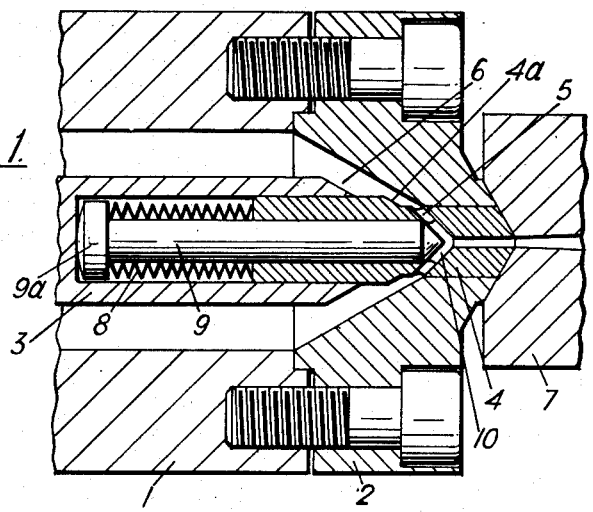
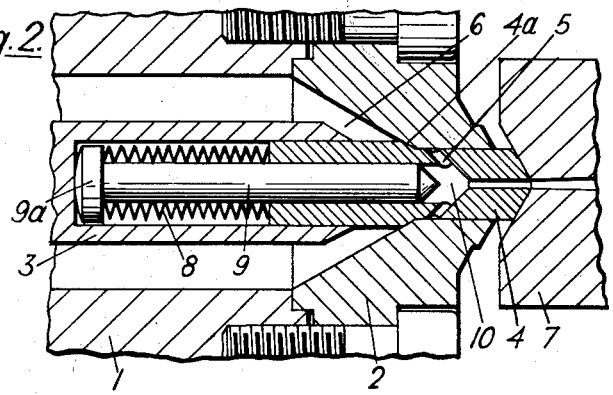
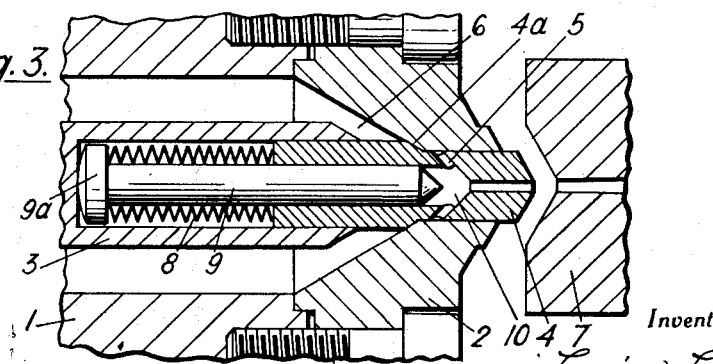
Inventor
Lucien Lievre
By Cushman, Darby & Cushman
Attorneys

United States Patent Office 3,095,609
Patented July 2, 1963

3,095,609
NOZZLE CLOSURE FOR INJECTION MOULDING PRESS
Lucien Lievre, Chazay D'Azergues, France, assignor to Societe Rhodiaceta, Paris, France, a French body corporate
Filed Jan. 22, 1962, Ser. No. 167,640
6 Claims. (Cl. 18—30)

In the injection moulding of polymers which are highly fluid in the molten state, for example polyamides, it is necessary to provide the nozzle of the injection press with a closure device intended to prevent the material from spontaneously escaping during the period when the press is open, since such escape would result in losses of material, would compromise the regularity of the filling of the mould and would result in disturbances in the moulding rate (difficult injection, cleaning of the nose of the nozzle, etc.).

Various solutions have been applied to this closure problem. For example, needle-like closure members have been proposed, in which the needle by which the outlet orifice of the nozzle is closed is carried by a piston actuated by the pressure of the material itself during the injection. Closure members consisting of a cock having a cylindrical or conical plug which is manually or automatically operated have also been proposed. Another type of closure member in current use is the flap valve type closure member in which the flap valve is opened by the pressure of the injection cylinder on the mould.

All these devices have one common disadvantage, namely that, when the closure member has been moved to its closing position, that is to say, after injection, the terminal channel of the nozzle, situated beyond the closure member, or the axial channel of the closure member itself in the case of a flap valve type device, contains molten polymer. This polymer is likely to run either over the forward face of the nozzle or into the mould at the instant when the latter is returned into position for the next injection.

The material thus flowing may solidify prematurely and produce either a deposit on the nose of the nozzle or obstruction of the injection channels of the mould itself, or again it may solidify in the mould before the injection proper and thus compromise the homogeneity of the moulded article.

The aforesaid disadvantage is particularly important in the case of Sprue-less moulding. (The Sprue is the solidified material coming from the injection channel situated between the nozzle and the actual cavity of the mould). In this case, the premature flow of the molten polymer takes place directly into the mould itself and this portion of the polymer therefore necessarily forms an integral part of the finished article.

At present, there is an increasing trend towards Sprueless moulding, more especially with the object of economising in material. The elimination of this disadvantage arising out of the presence of molten polymer in the terminal channel of the nozzle or of the valve is therefore very important in all cases and is of primordial importance in the particular case of Sprue-less moulding.

The present invention has for its object the provision of an improved closure for an injection moulding nozzle.

According to this invention, there is provided in an injection moulding press provided with a movable injection cylinder and an injection nozzle carried thereby, a closure for said nozzle, such closure comprising a valve slidably mounted in said nozzle and having a channel for the passage of material to be injected from the injection cylinder through the valve and outwardly thereof into a mould and a plunger fixed relatively to the injection cylinder, but resiliently connected to said valve, the arrangement being such that, on movement of the injection cylinder away from its injection position, supply of material to said channel is interrupted and the said plunger moves relatively to the valve and creates a suction on the upstream side of the injection channel in the valve.

It will be appreciated that, when using the closure of this invention, retraction of the injection cylinder between injection operations, causes any molten material in the injection channel of the valve to be sucked therefrom.

One example of a preferred construction of the closure according to the invention and its opposition will now be described with reference to the accompanying drawings in which:

FIGURE 1 is a longitudinal section through a nozzle provided with a closure according to this invention, the closure being shown in the injection position;

FIGURE 2 is a similar view, but showing the situation at the end of the injection operation when the nozzle has been separated from the mould, the valve of the closure still being in contact with the mould; and FIGURE 3 is a similar view, but showing the situation when the valve has in turn become separated from the mould.

Referring to the drawings, there is shown an injection press comprising an injection cylinder 1, a nozzle 2 secured to the said cylinder and a torpedo or spreader 3. The nozzle closure according to this invention comprises a valve 4 having one end disposed axially in a recess in the spreader 3 and its other end disposed axially in the nozzle and provided with ducts 5 for the passage through the valve of material 6 to be injected, this material circulating in the space between the spreader 3 on the one hand, and the injection cylinder 1 and the nozzle 2 on the other hand. The valve 4 is arranged to bear at its free end against the mould 7 during the injection period.

The valve 4 is formed of two axially spaced coaxial cylindrical parts connected by a frusto-conical part 4a forming an abutment on the inner wall of the nozzle and is resiliently coupled by a stack of spring washers 8 to a cylindrical plunger 9, the head 9a of which bears against the end of the recess in the spreader 3 and the free end of the body of which slides axially within the valve 4.

The closure is opened as follows: the application of the nozzle 2 carried by the injection cylinder 1 against the mould 7 causes the valve 4 to be pushed inwardly against the action of the spring washers 8 to the position shown in FIGURE 1 in which position the ducts 5 in the valve 4 are open to the space behind the nozzle permitting free circulation of the molten material 6 through the ducts 5 and the axial channel of the valve 4 into the mould 7.

Taking the various movements in chronological order, the movement of the closure to the closed position after injection takes place as follows:

The injection plunger (not shown) commences its return stroke, whereby the pressure exerted on the injection cylinder 1 by way of the material to be injected is relaxed.

The injection cylinder 1, and with it the nozzle 2, spreader 3 and plunger 9, is then returned to its rear position (or upper position in the case of a vertical press) under the action of springs not shown, and during the first part of this movement the valve 4 remains in contact with the mould 7 under the action of the spring washers 8.

That is, the cylinder 1, nozzle 2, spreader 3 and plunger 9, move relatively to the valve 4 until the position shown in FIGURE 2 is reached.

During this relative movement, the ducts 5 in the valve are first closed by the nozzle 2 and then a negative pressure is set upon on the upstream side of the axial channel in the valve 4 in a suction chamber 10 which is formed between the free end of the plunger 9 and the valve 4.

As the cylinder 1 continues its return movement from the position shown in FIGURE 2, it carries the valve 4 with it, since the nozzle 2 engages the part 4a of the valve and contact between the valve 4 and the mould 7 is broken at which time molten material still situated in the axial channel in the valve 4 is sucked into the chamber 10.

This axial channel in the valve 4 is therefore automatically emptied of molteen material between injection operations and conesequently there is no danger of material flowing into the mould.

The closure according to the present invention is particularly suitable for nozzle used for the injection moulding of thermoplastic materials which are highly fluid in the molten state, such as, more especially, polyolefines and polycondensates, for example polyamides.

I claim:

1. In an injection moulding press provided with an injection cylinder movable to and from a mould between an injection position and a retracted position and with an injection nozzle carried by this cylinder, a closure for said nozzle, such closure comprising a valve slidably mounted in said nozzle for limited movement relatively thereto and having an injection channel for the passage of material to be injected from the interior of the cylinder through the valve and outwardly thereof into the mould, means defining a chamber within said valve immediately upstream of said injection channel, the said valve having ducts leading into said chamber and positioned so that, when the cylinder is in its injection position, the valve is in such a position in the nozzle that the said ducts provide communication between the interior of the injection cylinder and the said chamber while when the cylinder is in its retracted position and relative movement between the nozzle and valve having occurred, the said nozzle closes this communication, and a plunger movable with the said injection cylinder and so resiliently connected to the said valve that, when the cylinder moves away from its injection position, the said plunger moves relatively to the valve and creates a suction in said chamber.

2. In an injection moulding press provided with an injection cylinder movable to and from a mould between an injection position and a retracted position and with an injection nozzle carried by this cylinder, a closure for said nozzle, such closure comprising a valve axially slidable in said nozzle and having one end projecting outwardly therefrom, an axial injection channel in said one end of the valve, the valve having an axial bore therein leading from the said injection channel and emerging at the end of the valve remote from said one end and also having ducts leading from the outer surface of the valve into the said bore at a position adjacent the said injection channel, the position of said ducts being such that they are closed by the said nozzle, but, when the nozzle is engaged against the mould and the said valve moved inwardly of the nozzle until the said one end of the valve is flush with the nozzle, the said ducts provide communication between the interior of said cylinder and said bore in the valve, and a plunger engaged within the said bore in the valve and resiliently biassed away from the latter and movable with the cylinder.

3. The closure specified in claim 2, in which cooperating shoulder and abutment means are provided respectively on the valve and nozzle to limit relative movement between them.

4. The closure specified in claim 3, in which the valve comprises two axially spaced coaxial cylindrical parts of different diameters and a frusto-conical part joining the two cylindrical parts and providing said shoulder means.

5. The closure specified in claim 2, in which the cylinder carries therewithin a spreader and said plunger has one end engaged in said valve bore and another end engaged in a recess in said spreader.

6. The closure specified in claim 5, in which a plurality of spring washers are arranged around the said plunger and bear between the valve and the said spreader.

References Cited in the file of this patent
UNITED STATES PATENTS

| | | |
|---|---|---|
| 2,265,995 | Beyerlein | Dec. 16, 1941 |
| 2,271,063 | De Mattia | Jan. 27, 1942 |
| 2,359,840 | Goessling | Oct. 10, 1944 |
| 2,422,990 | Spanier | June 24, 1947 |
| 2,602,189 | Finelt | July 8, 1952 |
| 2,872,705 | Labarre | Feb. 10, 1959 |